United States Patent
Hakki et al.

(10) Patent No.: US 10,369,506 B1
(45) Date of Patent: Aug. 6, 2019

(54) SYSTEM, METHOD, AND APPARATUS TO REDUCE URBAN AIR POLLUTION

(71) Applicant: Physician Electronic Networks, L.L.C., Dunedin, FL (US)

(72) Inventors: A-Hamid Hakki, Dunedin, FL (US); Edin Dervishalidovic, Sarajevo (BA); Belmina Hakki, Dunedin, FL (US); Amela Dervishalidovic, Sarajevo (BA)

(73) Assignee: Physician Electronic Networks LLC, Dunedin, FL (US)

( * ) Notice: Subject to any disclaimer, the term of this patent is extended or adjusted under 35 U.S.C. 154(b) by 0 days.

(21) Appl. No.: 16/194,436

(22) Filed: Nov. 19, 2018

(51) Int. Cl.
| | | |
|---|---|---|
| *B01D 19/00* | (2006.01) |
| *B01D 45/00* | (2006.01) |
| *B01D 46/00* | (2006.01) |
| *B01D 47/00* | (2006.01) |
| *B01D 49/00* | (2006.01) |
| *B01D 50/00* | (2006.01) |
| *B01D 53/00* | (2006.01) |
| *B01D 57/00* | (2006.01) |
| *B01D 59/00* | (2006.01) |
| *B01D 51/00* | (2006.01) |
| *B01D 46/42* | (2006.01) |

(Continued)

(52) U.S. Cl.
CPC ..... *B01D 46/0047* (2013.01); *B01D 46/0027* (2013.01); *B01D 46/4245* (2013.01); *B01D 46/4281* (2013.01); *B01D 47/06* (2013.01); *B01D 47/10* (2013.01); *B01D 50/006* (2013.01); *B01D 51/06* (2013.01); *B01D 53/502* (2013.01); *B01D 53/504* (2013.01); *B01D 53/56* (2013.01); *B01D 53/62* (2013.01); *B01D 53/72* (2013.01); *B01D 2221/16* (2013.01); *B01D 2251/304* (2013.01); *B01D 2251/606* (2013.01); *B01D 2258/06* (2013.01)

(58) Field of Classification Search
None
See application file for complete search history.

(56) References Cited

U.S. PATENT DOCUMENTS

| | | | |
|---|---|---|---|
| 3,655,058 A | | 4/1972 | Novak |
| 3,668,839 A | * | 6/1972 | Misarek ................. B01D 47/05 422/169 |

(Continued)

*Primary Examiner* — Amber R Orlando
*Assistant Examiner* — Phillip Y Shao
(74) *Attorney, Agent, or Firm* — Larson & Larson, P.A.; Frank Liebenow; Justin P. Miller

(57) ABSTRACT

A system for relocating polluted air includes a tubular chamber with an inlet at one end, an outlet at a end, and auxiliary venturi inlets between the inlet and the outlet. There is at least one fan arranged within the tubular chamber. The fan flows air from outside of the tubular chamber, through the tubular chamber and out of the tubular chamber through the outlet. A compression chamber compresses air before entering the heating chamber. There is at least one heating element within the heating chamber. The heating element(s) heat the air, thereby increasing the velocity of the air through the tubular chamber. The air exits the tubular chamber through the outlet, directed vertically and upward towards upper strata of the atmosphere to redirect the air (and pollutants) into the upper strata of the atmosphere. In some embodiments, filters and scrubbers are provided within the tubular chamber for reducing pollutants.

10 Claims, 4 Drawing Sheets

(51) Int. Cl.
  *B01D 47/06* (2006.01)
  *B01D 47/10* (2006.01)
  *B01D 51/06* (2006.01)
  *B01D 53/50* (2006.01)
  *B01D 53/56* (2006.01)
  *B01D 53/62* (2006.01)
  *B01D 53/72* (2006.01)

(56) References Cited

U.S. PATENT DOCUMENTS

| | | | |
|---|---|---|---|
| 3,811,249 A * | 5/1974 | Arnold | B01D 47/06 261/118 |
| 3,818,681 A * | 6/1974 | Loquenz | B01D 47/10 261/118 |
| 3,898,066 A | 8/1975 | Miskiewicz | |
| 3,972,697 A | 8/1976 | Short, Jr. | |
| 4,399,107 A | 8/1983 | Bose | |
| 4,597,781 A | 7/1986 | Spector | |
| 4,787,920 A * | 11/1988 | Richard | B01D 46/28 55/477 |
| 4,938,787 A * | 7/1990 | Simmerlein-Erlbacher | B01D 39/1676 95/198 |
| 5,268,253 A | 12/1993 | Van Rompuy | |
| 5,332,425 A | 7/1994 | Huang | |
| 5,433,771 A | 7/1995 | Bachovchin et al. | |
| 5,547,640 A | 8/1996 | Kim | |
| 5,591,412 A | 1/1997 | Jones et al. | |
| 5,676,913 A * | 10/1997 | Cirillo | B01D 46/0052 423/219 |
| 5,756,047 A * | 5/1998 | West | A61L 2/18 422/124 |
| 5,785,936 A | 7/1998 | Levendis | |
| 6,451,091 B1 | 9/2002 | Avina | |
| 6,919,049 B1 | 7/2005 | Roux | |
| 7,582,144 B2 | 9/2009 | Krigmont | |
| 7,709,115 B2 | 5/2010 | Leddy et al. | |
| 8,349,045 B2 | 1/2013 | Jarrier | |
| 8,398,744 B2 | 3/2013 | Rogers et al. | |
| 8,405,041 B2 | 5/2013 | Boutchich et al. | |
| 8,801,825 B2 | 8/2014 | Sessions et al. | |
| 8,934,212 B2 | 1/2015 | Tsuda et al. | |
| 9,341,138 B2 | 5/2016 | Russo et al. | |
| 9,636,617 B2 | 5/2017 | Wennerstrom et al. | |
| 2003/0089240 A1* | 5/2003 | Price | B01D 47/06 96/236 |
| 2011/0021134 A1 | 1/2011 | Zwern | |
| 2013/0336860 A1* | 12/2013 | Bjarno | B01D 53/504 423/210 |
| 2014/0271420 A1* | 9/2014 | Kirchman | B01D 53/1475 423/210 |
| 2014/0290087 A1* | 10/2014 | Weatherly | A45D 20/12 34/98 |
| 2016/0001214 A1* | 1/2016 | Chen | B01D 53/14 422/122 |
| 2016/0016105 A1 | 1/2016 | Wang | |
| 2016/0096134 A1 | 4/2016 | Santini et al. | |
| 2016/0236129 A1* | 8/2016 | Ajemian | B01D 46/0023 |

* cited by examiner

SYSTEM, METHOD, AND APPARATUS TO REDUCE URBAN AIR POLLUTION

FIELD

This invention relates to the field of clean environments and more particularly to a system for reducing air pollution through redistribution and/or cleaning/filtering.

BACKGROUND

Air pollution has always been a by-product of daily living since ancient times. Air pollution occurs when harmful substances such as particulates and biological molecules contaminate the atmosphere [Wikipedia]. Even before humans inhabited earth, fires caused by nature caused some degree of pollution. However, since humans inhabited this planet, pollution became synonymous with civilization, from the Stone Age to the industrial revolution, and continues in today's age of technology. Urban pollution affects the health and wellbeing of the majority of the world's population, even more those people living in cities. Heavy traffic, airports, industrial emissions, and burning of fossil fuel such as wood and coal are just a few causes of air pollution.

The definition of air pollution encompasses the release of waste gases such as carbon monoxide, nitrogen oxides, chlorofluorocarbons, and sulfur dioxides into the atmosphere along with particulate matter. The significance and ill effects of air pollution are related to the pollution's concentration, chemical composition, and duration. Motor vehicle emissions are one cause of this air pollution. In 2013, the World Health Organization estimated the annual death toll due to air pollution to be around seven million humans, not including pollution-related diseases such as cardiovascular and lung disease, and cancer. Infants, children and the elderly are especially vulnerable. As emissions from factories, vehicles, fires, etc. increase, so does the amount of air pollution, especially in localities with minimal winds such as valleys or areas in which hills/mountains block prevailing winds. Air pollution tends to settle at ground level where many people work, live, and play. For example, during the latter half of the 1900s, Los Angeles experienced dangerous levels of air pollution and smog.

Many efforts have been made to reduce emissions in an attempt to reduce air pollution including imposing heavy taxes on fuels and high tolls to reduce driving and encourage carpooling, programs to encourage electric vehicles, emission reduction requirements on factories, banning of fireplaces in new construction and limiting use of fireplaces in existing construction, etc. These efforts have made impacts in reducing pollution, but there are still large urban areas that have significant air pollution and smog.

What is needed is a system that will move the air pollution and smog from these urban areas and/or scrub the polluting materials from the air.

SUMMARY

The present invention relates to a method and system for reducing air pollution in the living environment in order to minimize the deleterious impact of pollution on the inhabitants. In particular, the present invention discloses a jet-like engine that is environmentally friendly and, in a preferred embodiment, uses electricity instead of fossil fuel to operate. The concept is to vacuum, compress, and heat large volumes of polluted air particularly in low lying urban areas and returning it to higher levels of the atmosphere where nature will help clean this heated air. In some embodiments, the heated air is also cleaned using a variety of air filters/scrubbers before returning the heated air to the atmosphere.

In one embodiment, a system for relocating polluted air is disclosed including a tubular chamber that has an inlet at one end, an outlet at a distal opposing end, and having auxiliary side inlets between the main inlet and the outlet. The tubular chamber is also a venturi. There is at least one fan arranged within the tubular chamber. The fan sucks air from outside of the tubular chamber, through the tubular chamber and out of the tubular chamber through the outlet. Air is compressed in the compression chamber to pressures about 40:1 compared to the inlet air pressure. As air is compressed, its temperature rises to about 200-550 Celsius before entering the heating chamber. There is at least one heating element within the tubular chamber. The heating element(s) further heat the now compressed air, thereby increasing the velocity of the air through the tubular chamber. The air exits the tubular chamber through the outlet, directed vertically and upward towards upper strata of the atmosphere to redirect the air (and pollutants) into the upper strata of the atmosphere.

In another embodiment, a method of reducing urban air pollution is disclosed including pulling polluted air into an inlet at one end of a tubular chamber having using at least one fan that is mounted within the tubular chamber. The velocity of the polluted air is increased by way of a narrowing of the tubular chamber that forms a venturi. The polluted air is directed out of an outlet at an opposing end of the tubular chamber distal from the inlet. The polluted air is discharged at high velocities from the outlet in an upward direction towards the upper strata of an atmosphere surrounding the tubular chamber.

In another embodiment, system for relocating polluted air is disclosed including a tubular chamber that has an inlet at one end, an outlet at a distal opposing end, and has a narrowing between the inlet and the outlet forming a venturi for increasing a velocity of the polluted air moving through the tubular chamber. There is at least one fan arranged within the tubular chamber. The fan moves the polluted air from outside of the tubular chamber, through the tubular chamber and out of the tubular chamber through the outlet. There is at least one heating element within the tubular chamber. The at least one heating element heats the polluted air, thereby increasing the velocity of the polluted air through the tubular chamber. There is at least one filter within the tubular chamber. The at least one filter removes pollution particles from the polluted air as the polluted air passes through the at least one filter. There is at least one scrubber within the tubular chamber. The at least one scrubber injects a fluid into the tubular chamber and the fluid captures pollution particles from the polluted air as the pollution particles interact with the fluid. The polluted air exiting the tubular chamber at high velocities through the outlet is directed vertically and upward towards upper strata of an atmosphere.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
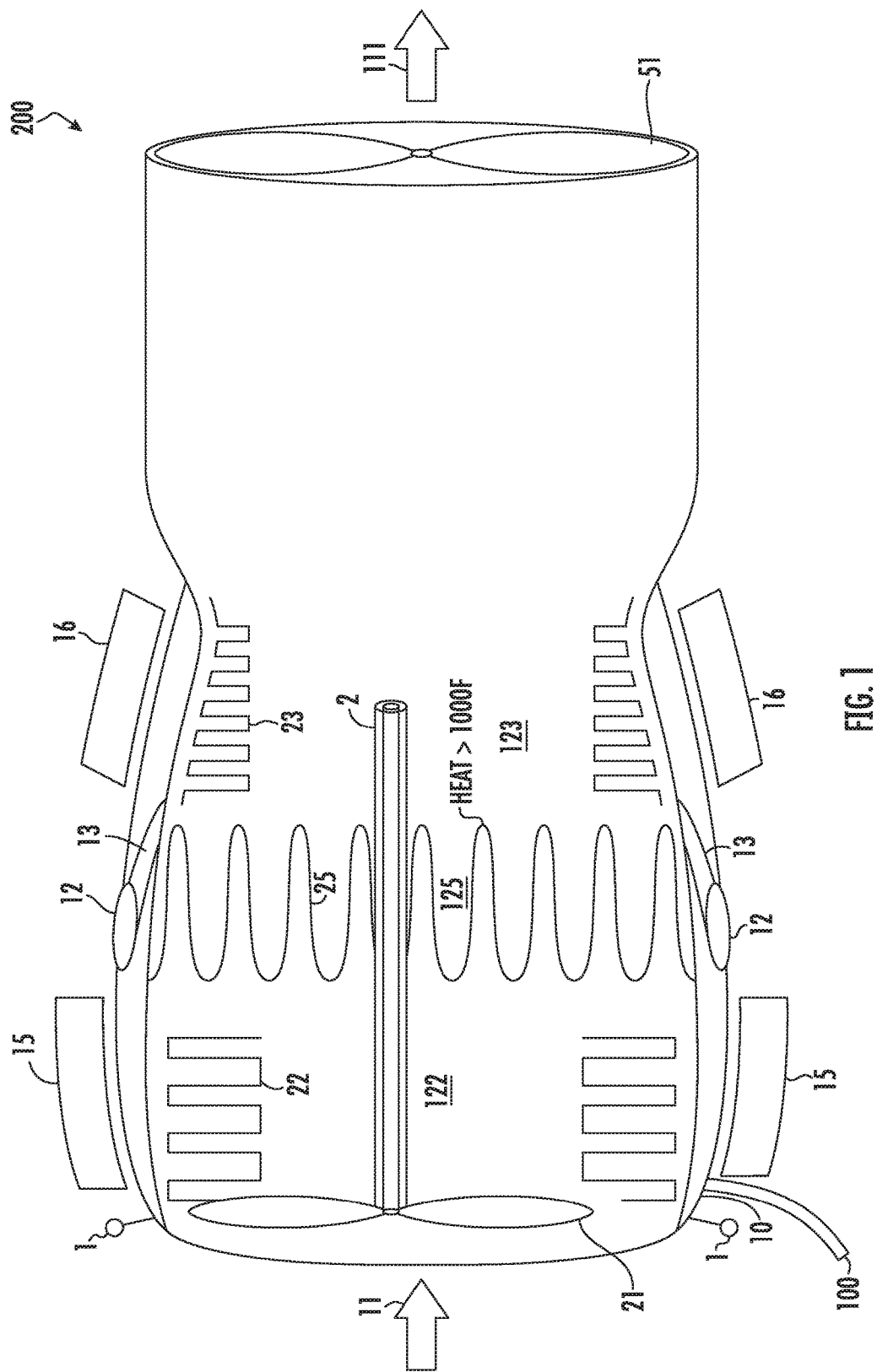
FIG. 1 illustrates a longitudinal-sectional view of a system for reducing urban air pollution.

Reference will now be made in detail to the presently preferred embodiments of the invention, examples of which are illustrated in the accompanying drawings. Throughout the following detailed description, the same reference numerals refer to the same elements in all figures.

At sea level at room air, air has a weight of 1.2 kg per cubic meter. An air-breathing (ducted) jet engine with turbofans can pull in 1,200 kg of polluted air per second. However, jet engines causes significant air pollution due to burning of fossil fuel required to cause aircraft lift. Airports and miles of surrounding space contain high concentration of air pollutants. Jet engine may compress more than 433 cubic feet (12.26 cubic meters) of air per second. The compression also raises the temperature of the air by about 550° Fahrenheit.

Electric heaters are devices that convert electric current to heat. Industrial heating is considered low temperature to about 400° C., medium temperature between 411 and 1,150° C. and high temperature of about 1,150 C or higher. Heat is produced by induction as well as by conduction, convection and radiation. Heating air causes expansion within a limited space and result in an exponential increase in gas pressure.

Referring to FIG. 1, a longitudinal-sectional view of a system for reducing urban air pollution 200 is shown. A jet engine-like tubular structure 10 has therein interfaced pollution sensors 1. An inlet 11 receives polluted air and an outlet 111 expels heated polluted air. A fan 21 at the main inlet 11 pulls polluted air into a high-pressure multistage compression chamber 122 (e.g. a tubular chamber). External sources of electricity are connected to the system through a wire 100. Such energy is preferably provided from solar power sources, hydro-electric power sources or wind turbines provide the main source of energy to operate the system. Auxiliary electricity may be produced using powerful stationary magnets 15/16 that encircle the compressor compartments 122/123 to convert mechanical energy of the rotating compressors 22 and turbines 23 to electrical energy. The rotating compressors 22 and turbines 23 rotate around an axel 2. Compressed air then enters the heating chamber 125 containing heating elements 25 that, in some embodiments, can raise the temperature of the compressed air within the heating chamber 125 to greater than 1,000 degrees Celsius. Accessory air inlets 12 use the Venturi principle to carry air through conduits 13 leading to the heating chamber 125. In some embodiments, the conduits 13 include a venturi to accelerate a velocity of air passing through the conduits 13. The rotating compressors will compress air into the heating chamber, further raising air temperature before entering the low pressure turbine chamber 123, and then out of the system for reducing urban air pollution 200. In some embodiments, a posterior fan 51 draws polluted air out of the system through the outlet 111. The system for reducing urban air pollution 200 is anticipated to be oriented in any direction, though it is preferred that the polluted air that exits the outlet 111 be directed upward into the upper layers of the atmosphere.

Figure 2:
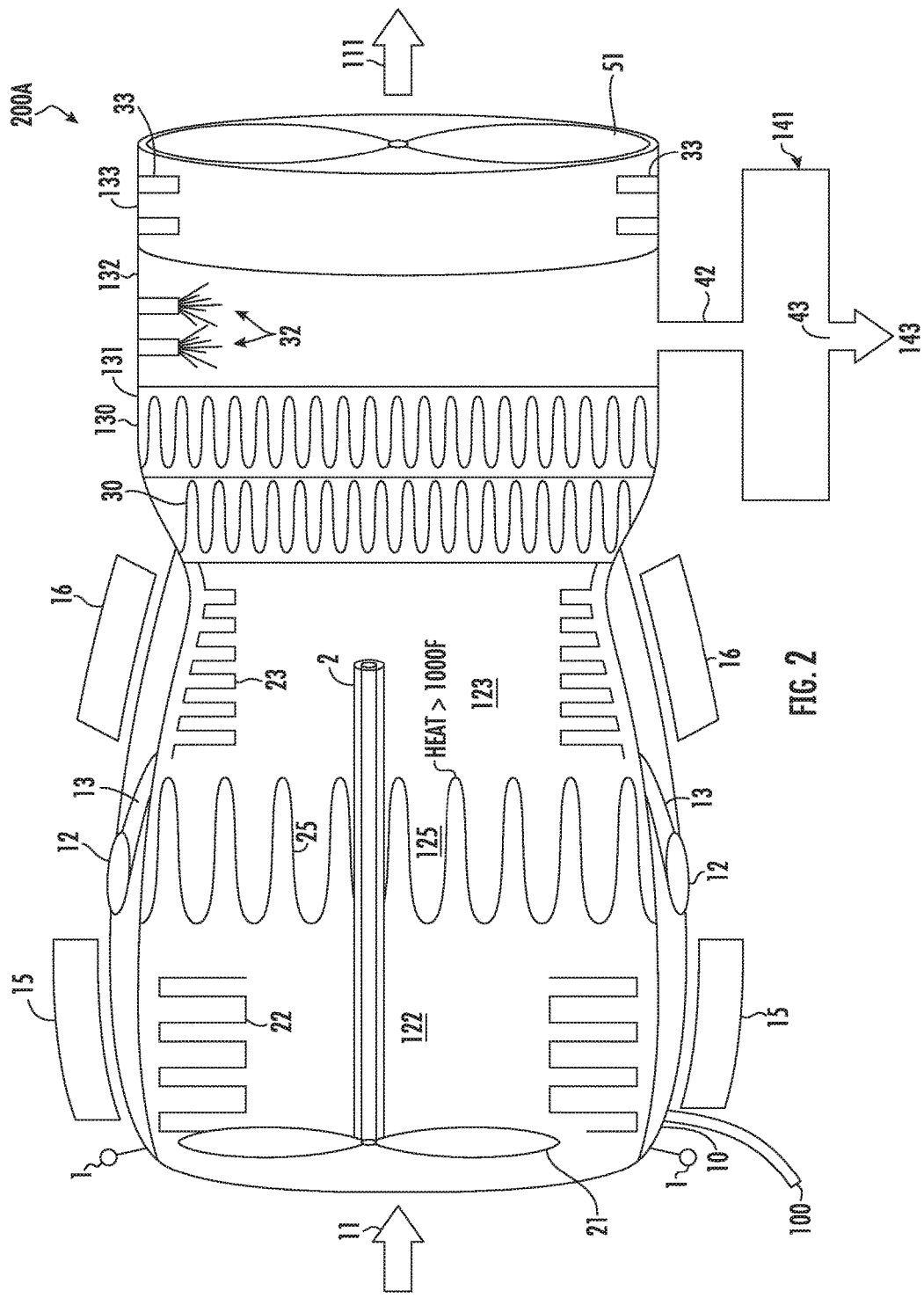
FIG. 2 illustrates a longitudinal-sectional view of a system for reducing urban air pollution including filtering and scrubbing.

Referring to FIG. 2, a longitudinal-sectional view of a system for reducing urban air pollution including filtering and scrubbing 200A is shown. A jet engine-like tubular structure 10 has therein interfaced pollution sensors 1. A main inlet 11 receives polluted air and an outlet 111 expels heated polluted air. A fan 21 at the main inlet 11 pulls polluted air into a high-pressure multistage compression chamber 122 and forces the polluted air out of the outlet 111. External sources of electricity, preferably provided from solar power sources, hydro-electric power sources or wind turbines provide the main source of energy to operate the system. Auxiliary electricity may be produced using powerful stationary magnets 15/16 that encircle the compressor compartments 122/123 to convert mechanical energy of the rotating compressors 22 and turbines 23 to electrical energy. The rotating compressors 22 and turbines 23 rotate around an axel 2. Compressed air then enters the heating chamber 125 containing heating elements 25 that, in some embodiments, can raise the temperature of the compressed air within the heating chamber 125 to greater than 1,000 degrees Celsius. Accessory air inlets 12 use the Venturi principle to carry air through conduits 13 leading to the heating chamber 125. The rotating compressors will compress air into the heating chamber, further raising air temperature before entering the low pressure turbine chamber 123, and then out of the system for reducing urban air pollution 200A into one or more of modular de-pollution chambers to remove pollutants before returning cleaner air to the environment. The number and type of filters depends on the pollutants in the polluted air. The processes used to remove or destroy contaminants have been extensively studied and published, and thus the details of which are not discussed for brevity reasons. In brief, these modules may vary in their number and order, but generally start with one or more particulate-filters chamber 130 comprising large surface area filters aligned in parallel with different size pores. The large surface area is made possible by serpentine configuration or finger-like projections in order to trap the largest number of particulate matter of different dimensions. The next chamber houses one or more rapidly rotating ionization chambers 131 where other pollutants are trapped by specialized filters and/or electrostatic precipitators 31 for removal of other pollutants. The now cleaner air then enters the scrubbing chambers 132 before exiting the outlet 111. In the scrubbing chambers 132, the now cleaner air is subjected to sprays of chemicals to further remove pollutants. In some embodiments, the scrubbing chambers 132 rotate at high speeds in order to circumvent the problem of extreme velocity of the particulates in the air flow. A scrubber includes sprayers 32 that spray a liquid into the scrubbing chamber 132 so that the liquid contacts the polluted air to remove pollution particles. Polluted liquid is drained into a reservoir 141 through one or more exit conduits 42. Drain pipes 43 periodically flush the reservoir 141, sending the polluted water to water treatment plants 143 where the polluted water is purified before releasing into the environment. In some embodiments, the outlet 111 may include drying compartments 133 having dryers 33 that dry the now cleaner air before exhausting the cleaner air into the atmosphere. In some embodiments, a posterior fan 51 pulls now cleaner air out of the system through the outlet 111.

The apparatus on the transport vehicle causes oxidation of pollutant from lower oxide to higher oxides, which are then recovered in a water solution that is emitted from the sprayers 32 using chemical reactants. Oxygenation occurs through nascent oxygen that may be produced by ozone decomposition and use of ultraviolet light with short wavelengths. In some embodiments, the sprayers 32 emit a fluid or washing liquid containing lime or a mixture of lime and sodium bicarbonate.

Figure 3:
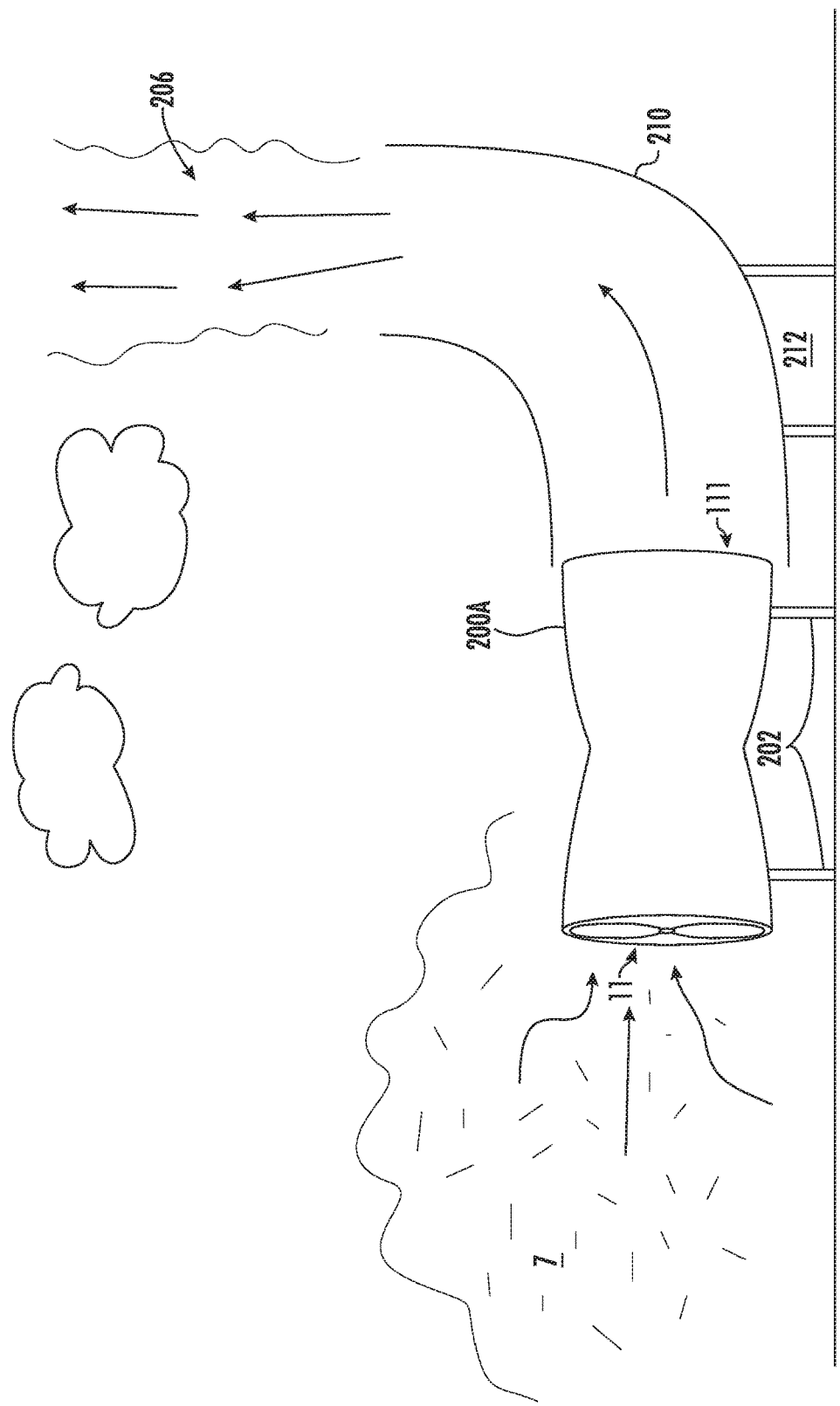
FIG. 3 illustrates a side view of a system for reducing urban air pollution including filtering and scrubbing.

Referring to FIG. 3, a side view of a system for reducing urban air pollution including filtering and scrubbing 200A is shown. In this example, polluted air 7 hovers near the surface and inlet 11 of the system for reducing urban air pollution including filtering and scrubbing 200A. The system for reducing urban air pollution including filtering and scrubbing 200A is supported with struts 202 as known in the industry. Having a horizontal configuration aids the system for reducing urban air pollution including filtering and scrubbing 200A in scrubbing the polluted air 7, utilizing gravitational force to allow the fluid emitted from the sprayers 32 to be distributed across a greater area of the cleaning chambers, and then collected through the one or more exit conduits 42.

Note that it is preferred that the now cleaner air that exits from the outlet 111 be directed upwardly into the upper strata of the atmosphere. As the now cleaner air exits the system for reducing urban air pollution including filtering and scrubbing 200A in a substantially horizontal direction, a redirector 210 is used to turn the flow of the now cleaner air so that the now cleaner air is directed upwardly into the upper strata of the atmosphere. The redirector 210 is supported by a second set of struts 212.

Figure 4:
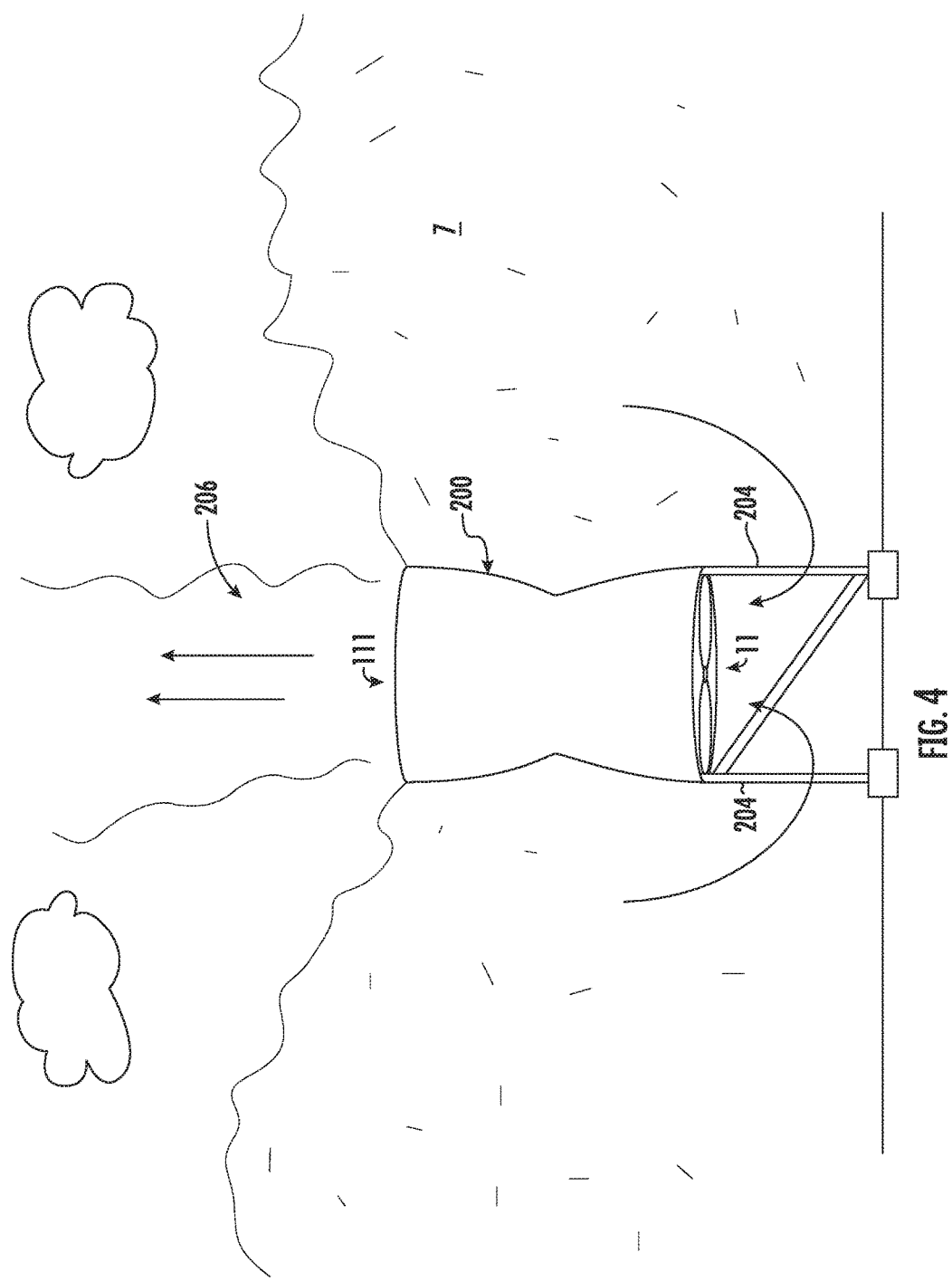
FIG. 4 illustrates a side view of a system for reducing urban air pollution.

Referring to FIG. 4, a side view of a system for reducing urban air pollution 200 is shown. In this example, polluted air 7 hovers near the surface and inlet 11 of the system for reducing urban air pollution 200. The system for reducing urban air pollution 200 is supported with struts 204 as known in the industry. Note that it is preferred that the now cleaner air that exits from the outlet 111 be directed upwardly into the upper strata of the atmosphere. Having a vertical configuration, the system for reducing urban air pollution 200 directs the now cleaner air upwardly into the upper strata of the atmosphere.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for relocating polluted air, the system comprising:
    a tubular chamber having an inlet at one end, an outlet at a distal opposing end, and having a narrow section between the inlet and the outlet forming a venturi, the tubular chamber being linear;
    a plurality of auxiliary inlets on sides of the tubular chamber between the inlet and the outlet, each auxiliary inlet having an opening to ambient air at one end and an opening within the tubular chamber at a distal second end, wherein the auxiliary input forms a venturi between the one end and the second end;
    at least one fan arranged within the tubular chamber, the at least one fan that forces polluted air to flow from outside of the tubular chamber, through the tubular chamber and out of the tubular chamber through the outlet; and
    at least one heating element within the tubular chamber, the at least one heating element heating the polluted air before the polluted air reaches the narrow section of the tubular chamber, thereby increasing a velocity of the air through the tubular chamber;
    whereas the polluted air exiting the tubular chamber through the outlet and is directed vertically and upward.

2. The system of claim 1, wherein the at least one heating element and the at least one fan is powered by electricity.

3. The system of claim 2, wherein the electricity is produced from solar power, hydro-electric power, and/or wind energy.

4. The system of claim 1, further comprising at least one filter within the tubular chamber, the at least one filter removing pollution particles from the polluted air as the air passes through the at least one filter.

5. The system of claim 1, further comprising at least one scrubber within the tubular chamber, the at least one scrubber injecting a washing liquid, the washing liquid capturing pollution particles from the polluted air as the pollution particles interact with the washing liquid.

6. The system of claim 5, wherein the washing liquid comprises lime, and sodium bicarbonate.

7. The system of claim 1, further comprising a compressor within the tubular chamber, the compressor further compressing the polluted air before the polluted air passes through the narrow section of the tubular chamber.

8. The system of claim 1, further comprising a turbine within the tubular chamber, the turbine further compressing the polluted air before the polluted air passes through the narrow section of the tubular chamber.

9. A system for relocating polluted air, the system comprising:
    a tubular chamber having an inlet at one end, an outlet at a distal opposing end, and having a narrowing between the inlet and the outlet forming a venturi for increasing a velocity of the polluted air moving through the tubular chamber, the tubular chamber being linear;
    a plurality of auxiliary inlets on sides of the tubular chamber between the inlet and the outlet, each auxiliary inlet forming a channel having an opening to ambient air at one end and an opening within the tubular chamber at a distal second end, wherein the auxiliary input forms a venturi between the one end and the second end;
    at least one fan arranged within the tubular chamber, the fan flowing the polluted air from outside of the tubular chamber, through the tubular chamber and out of the tubular chamber through the outlet;
    at least one heating element within the tubular chamber, the at least one heating element heating the polluted air before the polluted air reaches the narrow section of the tubular chamber, thereby increasing the velocity of the polluted air through the tubular chamber;
    at least one filter within the tubular chamber, the at least one filter removing pollution particles from the polluted air as the polluted air passes through the at least one filter; and
    at least one scrubber within the tubular chamber, the at least one scrubber injecting a washing fluid, the fluid capturing pollution particles from the polluted air as the pollution particles interact with the washing fluid;
    whereas the polluted air exiting the tubular chamber through the outlet is directed vertically and upward.

10. The system of claim 9, wherein the washing fluid comprises a solution comprising water, lime, and sodium bicarbonate.

\* \* \* \* \*